US012279130B1

(12) United States Patent
Potluri et al.

(10) Patent No.: US 12,279,130 B1
(45) Date of Patent: Apr. 15, 2025

(54) METHODS AND SYSTEMS FOR UPGRADING SITES OF A COMMUNICATION NETWORK

(71) Applicant: Verizon Patent and Licensing Inc., Basking Ridge, NJ (US)

(72) Inventors: Ravi Potluri, Coppell, TX (US); Jason T Wright, Novi, MI (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/387,107

(22) Filed: Nov. 6, 2023

(51) Int. Cl.
*H04W 16/18* (2009.01)
*H04L 41/082* (2022.01)
*H04L 41/0894* (2022.01)

(52) U.S. Cl.
CPC .......... *H04W 16/18* (2013.01); *H04L 41/082* (2013.01); *H04L 41/0894* (2022.05)

(58) Field of Classification Search
CPC .............. H04W 16/18; H04L 41/0894; H04L 41/0893; H04L 41/082
USPC ....................................................... 709/224
See application file for complete search history.

(56) References Cited

U.S. PATENT DOCUMENTS

| | | | |
|---|---|---|---|
| 2021/0227490 A1* | 7/2021 | Yiu | H04W 24/02 |
| 2021/0392170 A1* | 12/2021 | Kakinada | H04L 47/781 |
| 2021/0400501 A1* | 12/2021 | Wakim | G06Q 30/0201 |
| 2023/0229477 A1* | 7/2023 | Lin | H04W 24/02 718/1 |
| 2023/0396496 A1* | 12/2023 | Gabin | H04W 24/02 |
| 2023/0397047 A1* | 12/2023 | Xu | H04W 28/0289 |
| 2024/0236836 A1* | 7/2024 | Bangolae | H04W 8/22 |

* cited by examiner

*Primary Examiner* — Ruolei Zong

(57) ABSTRACT

One or more computing devices, systems, and/or methods for upgrading sites of a communication network are provided. Operational information of network functions within a communication network are tracked within a data repository. An upgrade ruleset is defined for identifying sites within a communication network to upgrade. The operational information, the upgrade ruleset, and model rules generated by a model for a set of candidate sites are processed to generate a positive list of sites to upgrade and a negative list of sites to not upgrade. The negative list of sites and criteria used to determine that the negative list of sites are not being upgraded are provided such as to a user. An upgrade process is performed to upgrade the sites within the positive list of sites.

20 Claims, 10 Drawing Sheets

METHODS AND SYSTEMS FOR UPGRADING SITES OF A COMMUNICATION NETWORK

BACKGROUND

A communication network may include complex virtualized network functions. Some network functions may be deployed at a network edge of the communication network. The network functions may be hosted across various layers of the communication network, such as a transport layer, a cloud layer, an application layer, a physical layer, etc. The communication network includes sites, such as cell sites, that may be configured and/or upgraded over time. The sites include network equipment and software used to facilitate communication, provide services, host applications, etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
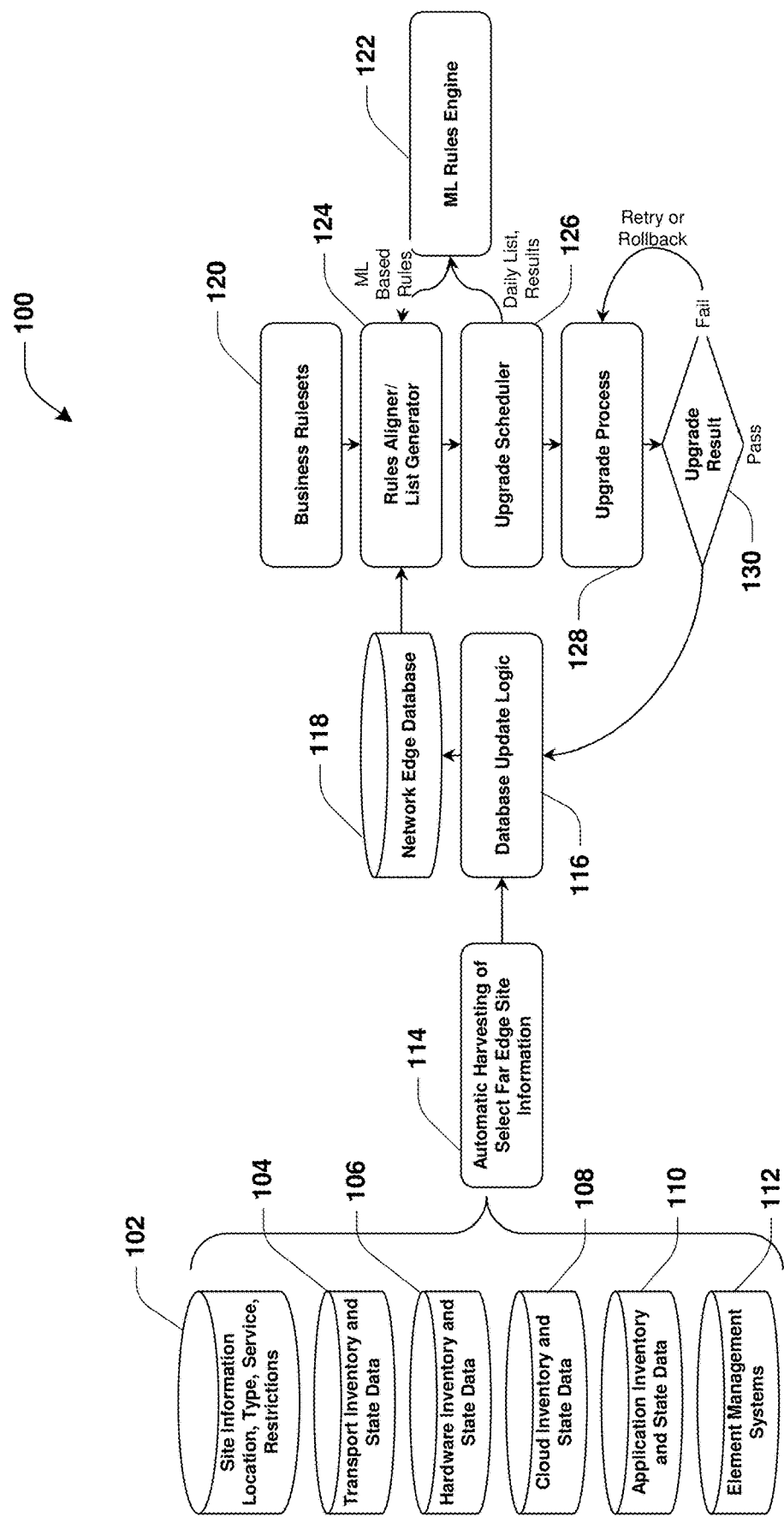
FIG. 1 illustrates an example of a system for upgrading sites of a communication network, in accordance with an embodiment of the present technology.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

One or more systems and/or techniques for upgrading sites and/or core network functions of a communication network (e.g. a 5g network) are provided. Thousands of sites, such as cell sites, may be deployed within the communicate network. The sites may comprise network equipment and/or other devices used to provide communication services, application hosting services, storage resources, and/or other services and functionality to user equipment (UE) connected to the communication network. Upgrading the sites is complex, time consuming, and challenging because there can be a large scale deployment of the sites that include network functions hosted at a network edge of the communication network. The techniques provided here are capable of upgrading sites at scale in a coordinated manner that reduces fallout (failure to upgrade a site) and proactively adjusts how the upgrade is performed based upon real-time feedback of whether sites are being successfully upgraded.

As part of upgrading sites in a scalable manner that reduces fallout, a data repository is used to store operational information of network functions within the communication network. The operational information, such as inventory and state data of network functions (e.g., key performance indicators), are periodically or continuously acquired and populated into the data repository so that the operation information is readily available for when an upgrade is to occur. The operational information may pertain to firmware versions of components, software versions, network equipment configurations such as a router setting, cloud resources, site information (e.g., services hosted at a site, locational information of the site, and any restrictions upon the site), hardware configurations, transport settings, applications hosted at a site, etc. The operational information may be acquired from an element management system or centralized controller of various functions, directly from hardware or physical or virtualized functions, business and network function databases, or tools. A data repository is automatically adjusted in real-time or near real-time as new types of operational information indicators are used (e.g., a new upgrade may specify that an application is be at a particular version for success, and thus version information for the application may be acquired and stored into the data repository that is modified to accommodate the version information).

Upgrade rulesets are defined for identifying sites within the communication network to upgrade. Different or multiple upgrade rulesets may be defined for different upgrade scenarios (e.g., upgrading a low band site, a high band site, a particular application version upgrade, etc.), certain regions where sites are located, certain market level criteria (e.g., upgrade in a manner that minimizes user disruption in certain locations), etc. An upgrade ruleset may specify that upgrade requirements/criteria are met when cloud software is running a particular version or greater (e.g., version X or greater), when accelerator hardware is running a particular version (e.g., version 1.02), when an application version is between two different versions (e.g., version 3.01 to 3.99), when a cell site router has a specific configuration set applied, and/or other criteria for certain regions, markets, and businesses.

In addition to the upgrade rulesets, a model (e.g., a machine learning model) is trained on positive lists of sites that were previously upgraded, negative lists of sites that were skipped for upgrade and reasons why the sites were skipped, and upgrade results such as whether and why a site failed to upgrade. When an upgrade is to be performed (e.g., an application upgrade, a firmware upgrade, a software upgrade, a configuration upgrade, a communication service upgrade, etc.), the model outputs model rules that can be used to determine which sites are good candidates for being successfully upgraded and which sites are bad candidates that will likely fail to upgrade.

The operational information from the data repository, the upgrade ruleset(s), and the model rules are used to generate a positive list of sites to upgrade and a negative list of sites to not upgrade. Sites that are likely to succeed at upgrade are included within the positive list of sites, while sites that are likely to fail at upgrade are included within the negative list of sites. A site is successfully upgraded if an upgrade (e.g., a software upgrade, a firmware upgrade, a configuration upgrade, etc.) completes and the site is still fully operational. A site fails at being upgraded if at least some or certain functionality of the site is not operational after the upgrade or the upgrade itself does not successfully complete. An upgrade process is configured to upgrade the sites within the positive list of sites, and skip the sites within the negative list of sites. The upgrade process refrains from upgrading the sites within the negative list of sites because such sites may have a relatively higher probably of failing to upgrade than other sites (e.g., sites with a 10% or greater chance of failing may be included within the negative list of sites). This improves the upgrade process and reduces fallout (failure) that otherwise results in service disruption for users.

The precision of identifying sites that are likely to succeed at upgrade and sites that are likely to fail at upgrade is improved through the implementation of a feedback loop that may be implemented by a feedback processor. Upgrade results from the upgrade process are collected and analyzed to identify which sites failed to upgrade and what caused the failure (e.g., an application, at a site that failed to upgrade, was on a version different than a version of the application at other sites that were upgraded successfully, and thus the application version may be a cause of the failure). The results of the analysis are populated within the data repository such as where the version of the application will now be tracked and an indication may be included to indicate that the version of the application is a relevant factor/criterion for whether the particular upgrade will be successful. The results of the analysis may also be used to train the model to take into account the application version when generating the model rules. Also, real-time remedial actions may be implemented during the upgrade process. If the upgrade of a site fails, then a remedial action may be determined and executed (e.g., upgrade the application to a new version). Once the remedial action is complete, the upgrade may be retried or resumed if the upgrade was paused. In this way, the upgrade process is improved by reducing fallout where sites fail to upgrade and UE connected to the site experience service disruptions.

Various embodiments of the present technology provide for a wide range of technical effects, advantages, and/or improvements to computing systems and components. For example, various embodiments may include one or more of the following technical effects, advantages, and/or improvements: 1) performing coordinated upgrades and configurations of sites in a disaggregated and multi-layer radio access network (RAN) environment: 2) managing a high volume (a large number of deployments) of components of sites to upgrade and configure, 3) minimizing service disruption during upgrade such as service disruptions of RAN clouds and network functions that are integral to services provided by the sites, 4) minimizing upgrade and configuration failures by not upgrading sites within the negative list, performing remedial actions in real time to address upgrade failures, and utilizing a feedback loop to improve the precision of determining whether sites are good or bad candidates for upgrade in order to minimize troubleshooting (e.g., troubleshooting resulting from user service disruption due to a site upgrade failure); 5) providing predictability, visibility, and convenience to service provider teams that manage services and network functions being upgraded (e.g., the negative list of sites and reasons why the sites may fail to upgrade may be provided to users as insight into what actions may be performed to make the sites ready for successful upgrade); 6) dynamically and automatically providing the ability to quickly locate and upgrade sites in a multi-layer and dependent mixed physical and virtualized environment (e.g., certain network functions, services, or components of a site may depend upon operation of other network functions, services, and components, and thus an upgrade order may be implemented to maintain any dependencies); and/or 7) dynamically adjusting to new input data by automatically modifying a structure of the data repository to accommodate new types of operation information to track and consider.

FIG. 1 illustrates an example of a system 100 for upgrading sites of a communication network. A harvesting component 114 is configured to acquire operational information of network functions within the communication network, such as disaggregated inventory and state data. The harvesting component 114 may retrieve operational information from a first data source 102 of site information such as location of a site, a type of site, a service provided by the site, and site restrictions. The harvesting component 114 may retrieve operational information from a second data source 104 of transport inventory and state data. The harvesting component 114 may retrieve operational information from a third data source 106 of hardware inventory and state data. The harvesting component 114 may retrieve operational information from a fourth data source 108 of cloud inventory and state data. The harvesting component 114 may retrieve operational information from a fifth data source 110 of application inventory and state data. The harvesting component 114 may retrieve operational information from a sixth data source 112 such as from element management systems.

In some embodiments, the harvesting component 114 performs automatic harvesting of select network edge operational information (e.g., far edge site information). The operational information may be periodically retrieved, continuously retrieved, or retrieved on-demand. The harvesting component 114 allows users to group various operational information such as key performance indicators (KPIs) into a weighted value for use in determining whether and when to upgrade certain sites. The harvesting component 114 utilizes database update logic 116 to populate the operational information within a data repository 118 (e.g., a network edge database). The database update logic 116 may automatically adjust a structure of the data repository 118 in order to store and manage an incoming operational information stream that may include new values not already tracked and stored in the data repository 118 (e.g., automatic creation of tables, rows, columns, functions, etc. to store and manage a new value). This provides zero touch (e.g., no human intervention) database management because the structure is dynamically controlled as new operational information indicators are feed into the data repository, which protects the integrity of the data repository from human error and allows for continuous data feeds from multiple data sources. In some embodiments, the data repository is used to store near real time customized data sets, of operational information from a far edge environment, on a per site or per network function basis for quick and efficient access. In this way, the data repository 118 provides a near real time consolidated repository for pertinent inventory, data, and performance information so that upgrade processes can be quickly and efficiently managed and executed.

Upgrade rulesets 120 (business rulesets) may include predefined or user defined rules and logic used to filter sites as either being eligible or ineligible sites for upgrade based upon whether certain criteria are met for a particular upgrade version and/or upgrade scenario. Different or multiple upgrade rules may be defined for different upgrade scenarios, certain regions where sites are located, certain market level criteria, etc. An upgrade ruleset may specify that upgrade requirements/criteria are met when cloud software is running a particular version or greater, when a component such as an accelerator hardware is running a particular version, when an application version is between two different versions, when a cell site router has a specific configuration set applied, and/or other criteria created for certain regions, markets, and businesses.

A machine learning rules engine 122 may utilize a model to generate model rules used to determine whether sites are eligible or ineligible sites for upgrade. A part of training, the machine learning rules engine 122 obtains upgrade results 130 that include lists of candidate sites and results of upgrading the candidate sites (e.g., whether a site was successfully upgraded, whether a site failed to upgrade, an error or cause of a failure to upgrade a site, operational information of the site, operational information used to determine that a site could be upgraded but failed to upgrade, etc.). The machine learning rules engine 122 trains a model (a machine learning model) using the lists of candidate sets and the results of upgrading the candidate sites in order to output model rules that can be used by a list generator 124 to output positive lists of sites to upgrade and negative lists of sites to not upgrade.

The list generator 124 (rules aligner/list generator) processes the operational information from the data repository 118, an upgrade ruleset for a current upgrade to perform (e.g., an upgrade ruleset for a particular region and/or upgrade scenario), and the model rules to generate a positive list of sites to upgrade and a negative list of sites to not upgrade. The positive list of sites may include sites whose operational information (e.g., application version, firmware version, router configuration, etc.) meets criteria defined by the upgrade ruleset and the model rules. The negative list of sites may include sites whose operational information (e.g., application version, firmware version, router configuration, etc.) does not meet criteria defined by the upgrade ruleset and the model rules.

The positive list of sites to upgrade, and/or the negative list of sites to not upgrade, are input into an upgrade scheduler 126. The upgrade scheduler 126 enforces upgrade rules such as where an upgrade is only to occur during a particular timeframe (e.g., during the night in order to mitigate service disruptions during peak hours), where an upgrade is not performed during local or global network freezes, and/or where an upgrade does not conflict with other planned work or events. The upgrade scheduler 126 controls the upgrade process 128 to skip upgrading the sites within the negative list of sites because such sites may have a relatively high likelihood of failing to upgrade (e.g., a 15% or greater chance of failure). The upgrade process 128 upgrades the sites within the positive list of sites because such sites may have a relatively low likelihood of failing to upgrade (e.g., less than a 15% chance of failure).

Results 130 of upgrading the sites is collected such as part of a feedback loop. The results 130 are feed into the database update logic 116 for updating the data repository 118. Also, the results 130 are fed into the machine learning rules engine 122 for training the model. If the results 130 indicate a failure, then an upgrade may be paused, the model may be trained with information regarding the failure (e.g., operational information of the site), a remedial action may be performed (e.g., firmware may be upgraded, an application may be rolled back to a particular version, a network component may be reconfigured, etc.), and the upgrade may be resumed or restarted.

In some embodiments, at least one of the harvesting component 114, the database update logic 116, the list generator 124, the machine learning rules engine 122, the upgrade scheduler 126, and/or the upgrade process 128 may be hosted by an upgrade list generator further described in relations to FIGS. 3, 4, and 5A-5C.

Figure 2:
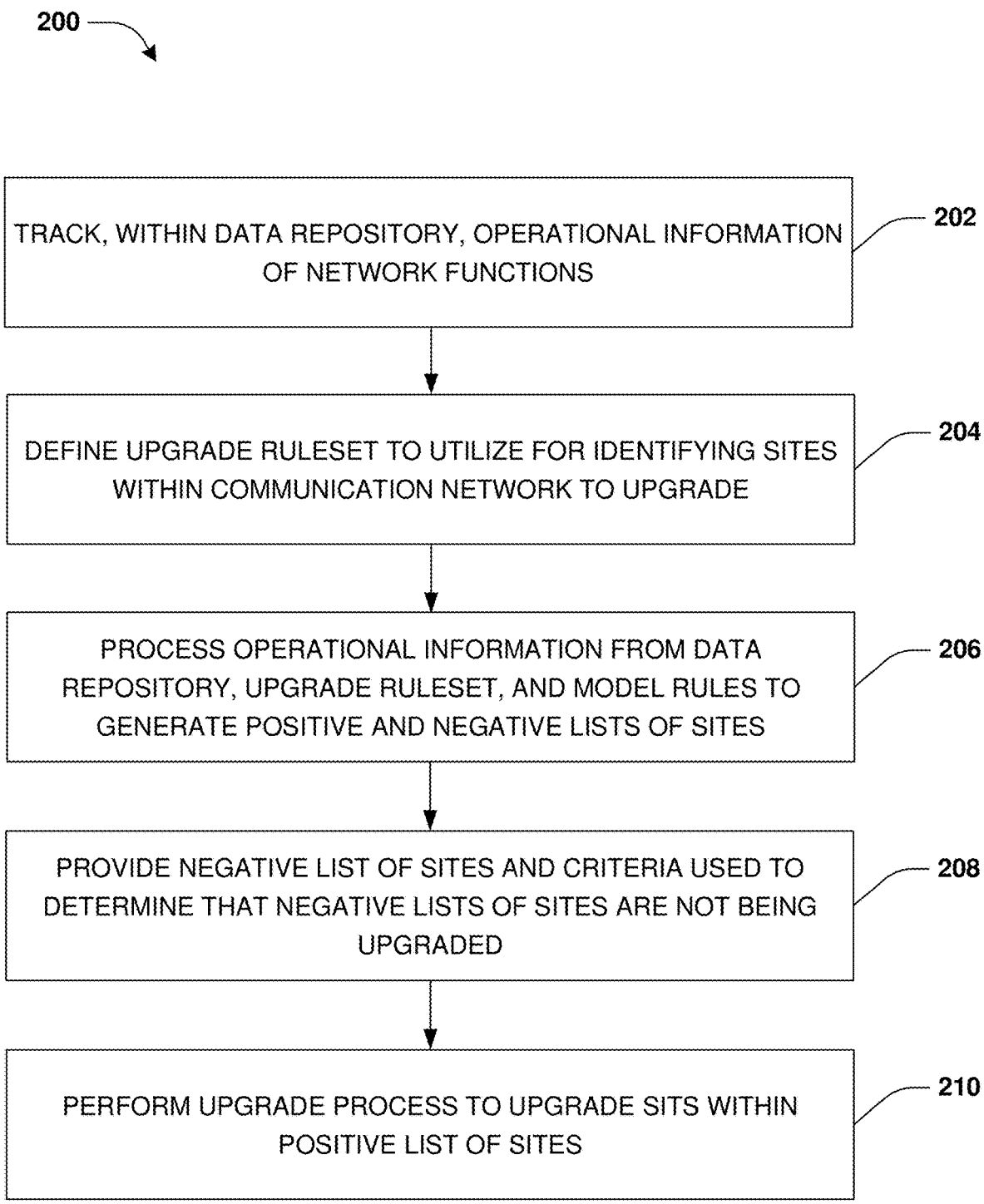
FIG. 2 is a flow chart illustrating an example method for upgrading sites of a communication network, in accordance with an embodiment of the present technology.
Figure 3:
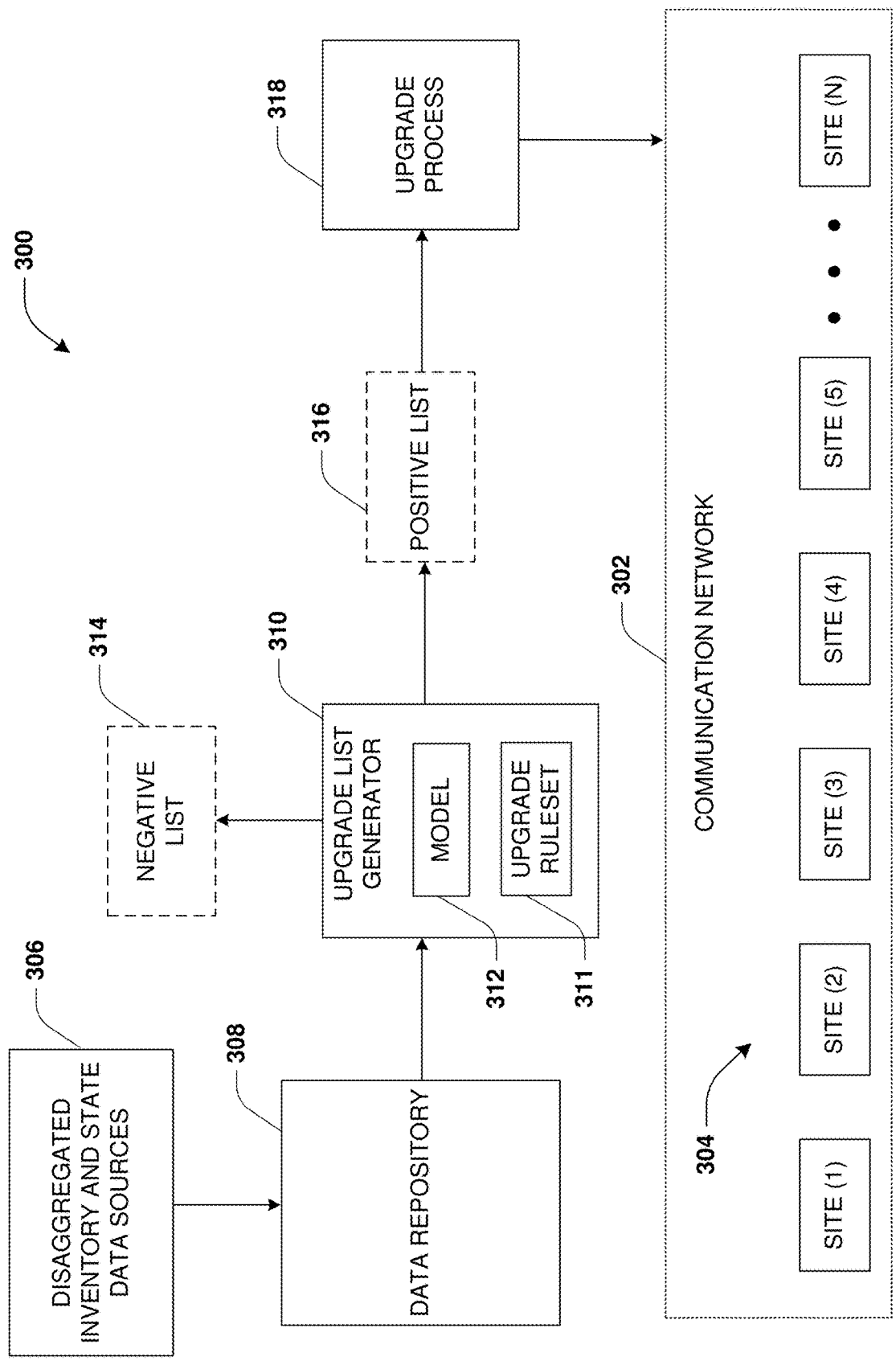
FIG. 3 illustrates an example of a system for upgrading sites of a communication network, in accordance with an embodiment of the present technology.
Figure 4:
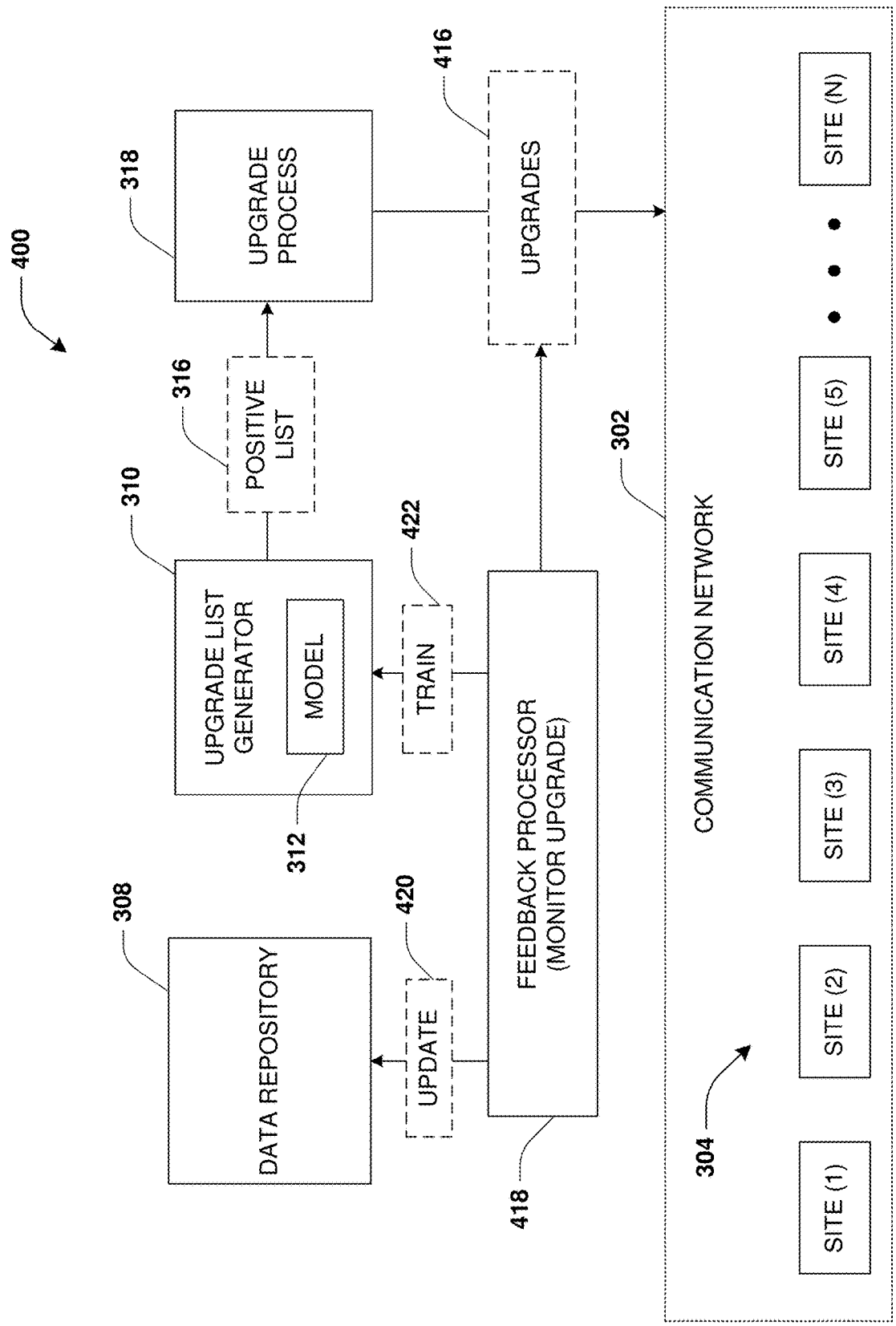
FIG. 4 illustrates an example of a system for upgrading sites of a communication network where a feedback processor implements a feedback loop, in accordance with an embodiment of the present technology.
Figure 5A:
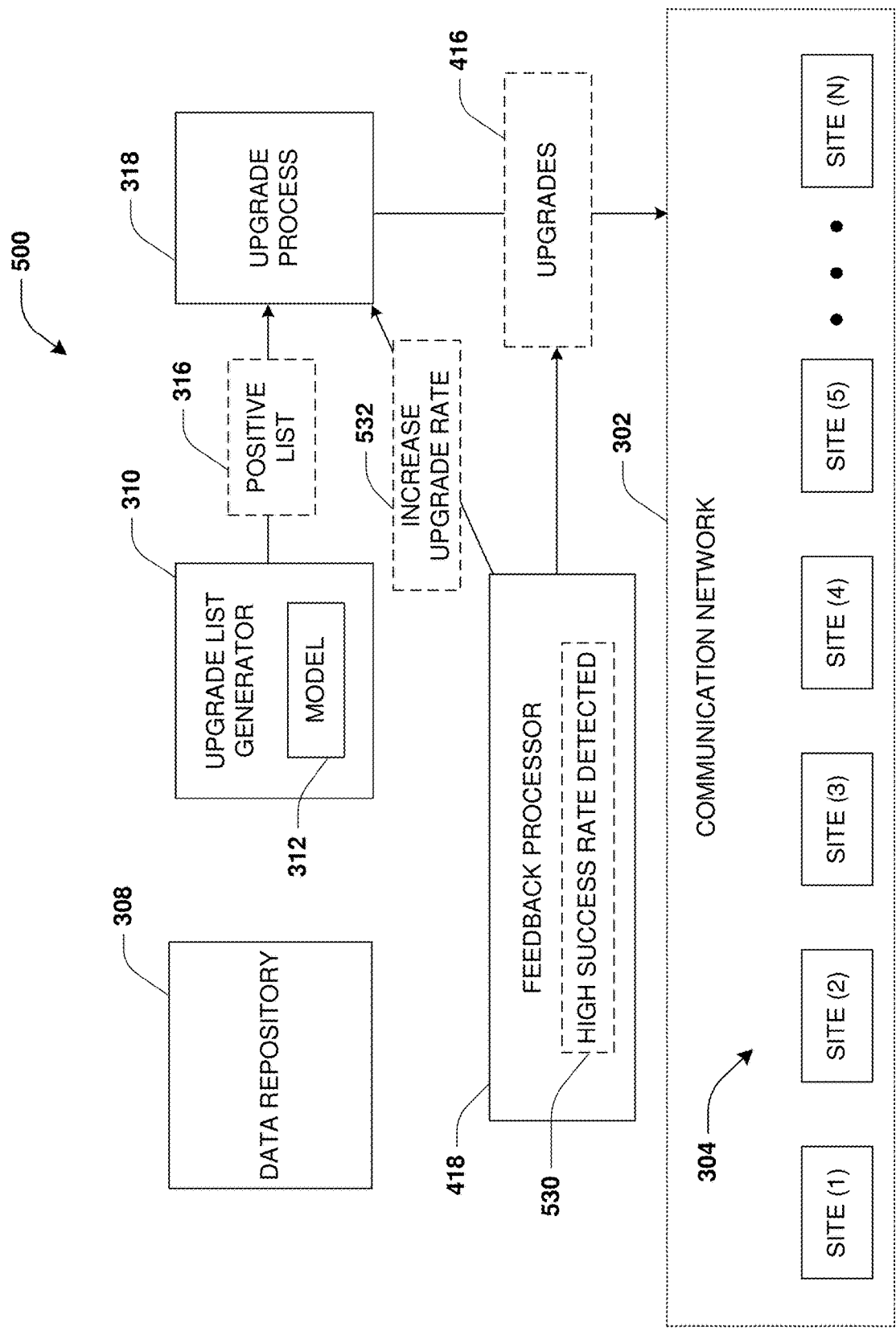
FIGS. 5A-5C illustrate an example of a system for upgrading sites of a communication network where a feedback processor monitors the upgrade of the sites, in accordance with an embodiment of the present technology.
Figure 5B:
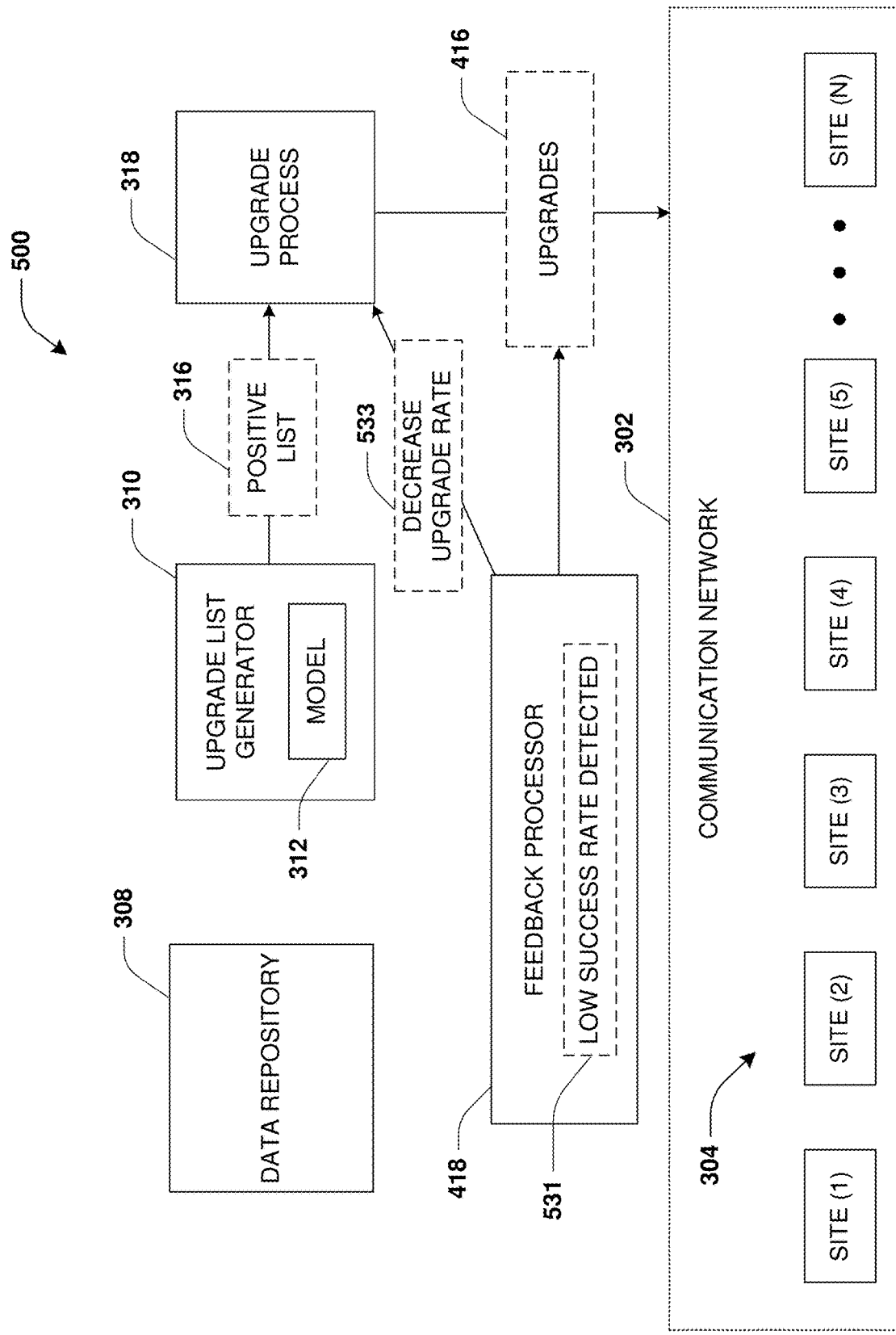
Figure 5C:
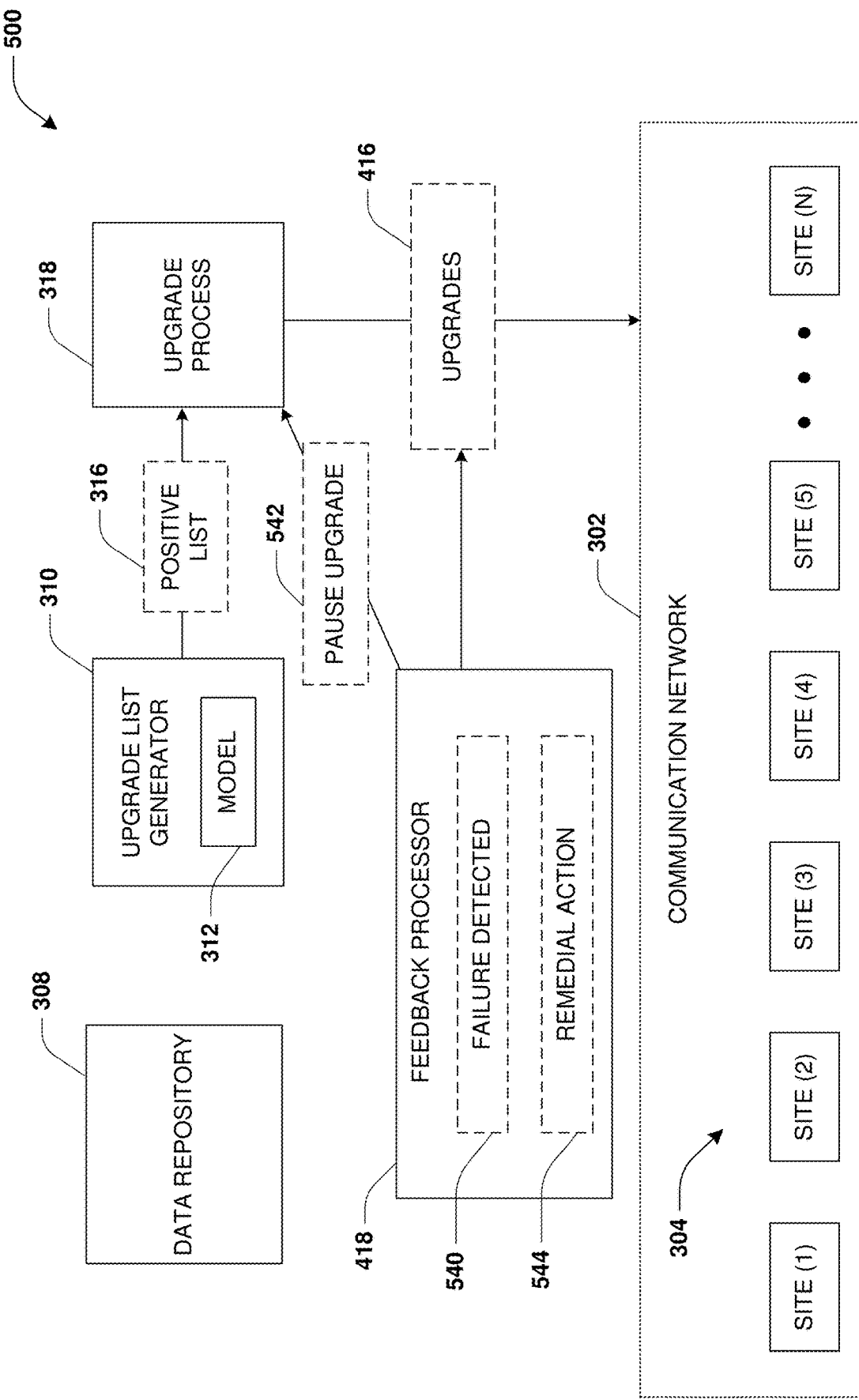

FIG. 2 is a flow chart illustrating an example method 200 for upgrading sites of a communication network, which is described in conjunction with system 300 of FIG. 3, system 400 of FIG. 4, and system 500 of FIGS. 5A-5C. A communication network 302 may comprise a plurality of sites 304 (e.g., thousands of cell sites) used to provide communication services for communicating over the communication network 302, application hosting services, cloud services, storage services, and/or a variety of services (network functions) for UE connected to the communication network 302. The services (network functions) may be upgraded such as when there is a new application, service, or network function to release. In this way, one or more of the sites may be upgraded.

In order to control an upgrade process in a manner that reduces fallout (upgrade failures), operational information of network functions is tracked within a data repository 308, during operation 202 of method 200. In some embodiments, the operational information is obtained from disaggregated inventory and state data sources 306, such as from site information, transport inventory and state data, hardware inventory and state data, cloud inventory and state data, application inventory and state data, and/or element management systems. In some embodiments, a weight may be applied to an operational information indicator or set of operational information indicators (e.g., key performance indicators may be grouped into a weighted value). When a value for the operational information indicator is received, the weight may be applied to the value to create a weighted value stored within the data repository. In this way, the weighted value can be used as part of training a model 312 to output model rules for selecting sites to upgrade.

During operation 204 of method 200, an upgrade ruleset 311 is defined for use by an upgrade list generator 310 for selecting which sites to upgrade and which sites to not upgrade. The upgrade ruleset may specific various criteria that must be met for a site to be eligible for upgrade, such as a component having a certain firmware version, an application having a particular application version, a network setting that must be enabled, and/or a wide variety of other criteria to meet for a site to be successfully upgraded. The criteria may specify a value (e.g., version X), a binary value (e.g., yes, no), a range of values (e.g., versions 1 to 3), an upper threshold (e.g., version 6 or less), a lower threshold (e.g., version 4 or great), or a set of values (e.g., version 1, 2, or 5). In some embodiments, different upgrade rulesets may be defined for different upgrade releases. If a particular upgrade release is to be performed (e.g., a release of a feature in a particular geographical location), then an upgrade ruleset mapped to the upgrade release may be selected. In some embodiments, different upgrade rulesets may be defined for different upgrade scenarios (e.g., upgrading a low band site, upgrading a high band site, etc.). If an upgrade process is to be implemented for a particular upgrade scenario of a site, then an upgrade ruleset mapped to the upgrade scenario may be selected for performing the upgrade process for that site.

In some embodiments, a rule may be defined for selecting sites to upgrade. The rule may be defined based upon a customer service disruption criterion such as where a site is to be upgraded during a timeframe that minimizes customer service disruption or is skipped if the customer service disruption will be too large or long. The rule may be used by the upgrade list generator 310 to generate positive and negative lists of sites to upgrade or not upgrade.

In some embodiments, a rule may be defined that an upgrade process 318 is to upgrade sites that are geographically proximate one another (e.g., upgrade clusters of neighboring sites). The rule may be used by the upgrade list generator to generate positive and negative lists of sites to upgrade or not upgrade. In some embodiments, a rule may be defined that the upgrade process 318 is to upgrade sites that are geographically dispersed with respect one another. The rule may be used by the upgrade list generator to generate positive and negative lists of sites to upgrade or not upgrade.

During operation 206 of method 200, the upgrade list generator 310 processes the operational information from the data repository 308, the upgrade ruleset 311 for the particular upgrade that is to be performed, and model rules generated by a model 312 for a set of candidate sites. The upgrade list generator 310 outputs a positive list of sites 316 to upgrade and a negative list of sites 314 to not upgrade. A site may be included within the positive list of sites 316 to upgrade based upon the site satisfying criteria of the upgrade ruleset 311 and the model rules. A site may be included within the negative list of sites 314 based upon the site not satisfying criteria of the upgrade ruleset 311 and/or the model rules.

During operation 208 of method 200, the negative list of sites 314 and criteria used to determine that the negative list of sites 314 are not to be upgraded (e.g., reasons why the sites will not be upgraded) are provided such as through a user interface, a message, a report, etc. to a user so that the user can perform a remedial action (e.g., firmware upgrade) so that the sites will now satisfy the criteria of the upgrade ruleset 311 and the model rules. Suggested remedial actions may be identified and provided to the user for selection and execution.

During operation 210 of method 200, the upgrade process 318 is performed to upgrade the sites within the positive list of sites 316. In some embodiments, the upgrade process 318 may upgrade certain sites according to a timeframe scheduled for upgrading those sites. The upgrades may be scheduled so that the timeframe does not conflict with a planned network outage, a local network freeze, a global network freeze, or an event. In some embodiments, dependencies amongst network functions may be identified (e.g., operation of a first network function may rely upon operation of a second network function). Accordingly, the upgrade process 318 is controlled to upgrade the sites according to an upgrade order that preserves the dependencies (e.g., the second network function may not be upgraded until the first network function is upgraded).

In some embodiments, the upgrade order may be determined based upon a specific sequence with which adjacent network functions are to be upgraded in order to maintain service for UEs. For example, an element management system (EMS) is upgraded before a virtual centralized unit (VCU). The VCU is upgraded before a fronthaul gateway (FHGW)/FSU. The FHGW/FSU is upgraded before a base station such as an eNB. The eNB is upgraded before a virtual distributed unit (VDU). The VDU is upgraded before radios. In addition, the level/version of software and firmware of these network functions are determined and taken into account such as for upgrading network functions in a far edge of a communication network. Otherwise, an upgrade of a network function (e.g., the VDU) may fail or cause a service interruption.

Certain types of networks such as a 5G network provide features that are also taken into account such as virtualization, re-normalization of network functions, new protocols, etc. In some embodiments such as with virtualization, certain upgrades are sequenced based upon soft dependencies (e.g., an upgrade may still succeed even if a dependency is not strictly adhered to) and/or hard dependencies (e.g., an upgrade will fail if the hard dependency is not adhered to). In some embodiments, dependencies are taken into account during upgrade or install amongst VDUs and VCUs, or between control plane and data plane elements (e.g., CU-CP and CU-UP). In some embodiments, clock synch among virtualization of hardware, radios, and VDUs are taken into account during upgrade. In some embodiments, throughput, latency, and/or other currencies enabled by 5G by changing protocols are taken into account.

A feedback processor 418 may implement a feedback loop to monitor upgrades 416 performed by the upgrade process 318 for the sites within the positive list of sites 316, as illustrated by FIG. 4. The feedback processor 418 may update 420 the data repository 308 with feedback relating to which sites were successfully upgraded, which sites failed to upgrade, and information relating to reasons why the sites failed to upgrade. The feedback may relate to collected operational information relating to sites that were successfully upgraded and/or sites that were not successfully upgraded. The feedback may also be used to train 422 the model 312 to filter out, using model rules, one or more sites that are similar to sites that were not successfully upgraded, as indicated by the feedback.

The feedback processor 418 may determine a success rate of upgrading the sites. If the success rate exceeds 530 a rate control limit (e.g., a certain rate of sites successfully upgrading), then the rate of upgrading 416 the sites may be increased 532 in order to increase to efficiency of the upgrade process 318, as illustrated by FIG. 5A.

The feedback processor 418 may determine a failure rate of upgrading the sites. If the failure rate exceeds 531 a rate control limit (e.g., a certain rate of sites failing to be upgraded), then the rate of upgrading 416 the sites may be reduced 533 (e.g., when the failure rate exceeds a threshold set by the rate control limit) or the upgrade process 318 may be paused (e.g., when the failure rate exceeds an upper threshold set by the rate control limit), as illustrated by FIG.

5B. Information regarding the sites that failed (e.g., operational information) may be used to train 422 the model 312. Once the model 312 is trained 422 and ready to output updated model rules, the upgrade process may be resumed or the rate of upgrading sites may be increased.

If a particular issue/failure is detected 540 while upgrading a site, the upgrade of the site may be paused 542, as illustrated by FIG. 5C. A remedial action 544 may be selected and performed for the site (e.g., a firmware upgrade). Once the remedial action 544 is performed, the upgrade for the site may be resumed or restarted.

In some embodiments, the techniques described herein can be implemented for various scenarios. Dependencies that can affect how to upgrade sites can span across multiple layers and domains of a communication network. For example, an upgrade may be limited to distributed units (DUs) supporting cells of a particular band (e.g., a band-4), which operate with a virtual centralized unit (vCU) having a particular version (e.g., a version 23A). This is a software+radio domain dependency. There can be additional dependencies, such as transport layer dependencies, container as a service (CaaS) hardware, etc. Such dependencies are taken into account when determining which sites to upgrade. In some embodiments, there are rate control requirements, which may be user specified such as from an operations team. Accordingly, an additional upgrade rate control may be layered into the multiple layers that are taken into account when determining which sites to upgrade. The additional upgrade rate control may be based upon business criteria (e.g., ensuring certain regions or customers are not disrupted) and technology considerations. In some embodiments, intelligence for upgrade management is provided by implementing a learning process (e.g., a feedback loop) that evaluates existing deployments and suggests (e.g., utilizing inferences) a target upgrade rate based on selected sites (e.g., a rate of upgrading sites over time) and/or maintenance windows available for upgrading site in order to achieve a schedule that preserves radio-level cohesion of upgrades.

According to some embodiments, a method is provided. The method includes tracking, within a data repository, operational information of network functions within a communication network; defining an upgrade ruleset to utilize for identifying sites within the communication network to upgrade; processing the operational information from the data repository, the upgrade ruleset, and model rules generated by a model for a set of candidate sites to generate a positive list of sites to upgrade and a negative list of sites to not upgrade; providing the negative list of sites and criteria used to determine that the negative list of sites are not being upgraded; and performing an upgrade process to upgrade the sites within the positive list of sites.

According to some embodiments, the method includes monitoring the upgrade process to determine a failure rate of upgrading the sites within the positive list of sites; and in response to the failure rate exceeding a rate control limit, reducing a rate of upgrading the sites or pausing the upgrade process.

According to some embodiments, the method includes training the model utilizing information regarding sites that the upgrade process failed to upgrade; and in response to the model being trained, increasing the rate of upgrading the sites or resuming the upgrade process.

According to some embodiments, the method includes monitoring the upgrade process to determine a success rate of upgrading the sites within the positive list of sites; and in response to the success rate exceeding a rate control limit, increasing a rate of upgrading the sites.

According to some embodiments, the method includes scheduling the upgrade process for a timeframe that does not conflict with at least one of a planned network outage, a local network freeze, a global network freeze, or an event.

According to some embodiments, the method includes collecting feedback from the upgrade process, wherein the feedback relates to collected operational information related to sites that were successfully upgraded and sites that were not successfully upgraded; updating the data repository based upon the feedback; and training the model utilizing the feedback, wherein the model is trained to filter out one or more sites similar to the sites that were not successfully upgraded.

According to some embodiments, the method includes in response to detecting that an upgrade will utilize a new operational information indicator, modifying a structure of the data repository for tracking the new operational information indicator; and populating the data repository with values for the new operational information indicator.

According to some embodiments, the method includes identifying dependencies amongst the network functions; and controlling the upgrade process to upgrade the sites within the positive list of sites according to an upgrade order that preserves the dependencies.

According to some embodiments, a computing device comprising memory storing instructions and comprising a processor that executes the instructions to perform operations, is provided. The operations include tracking, within a data repository, operational information of network functions within a communication network; defining an upgrade ruleset to utilize for identifying sites within the communication network to upgrade; processing the operational information from the data repository, the upgrade ruleset, and model rules generated by a model for a set of candidate sites to generate a positive list of sites to upgrade and a negative list of sites to not upgrade; providing the negative list of sites and criteria used to determine that the negative list of sites are not being upgraded; and performing an upgrade process to upgrade the sites within the positive list of sites.

According to some embodiments, the operations include defining different upgrade rulesets for different upgrade releases; and in response to determining that an upgrade release is to be performed, selecting the upgrade ruleset corresponding the upgrade release for performing the upgrade process.

According to some embodiments, the operations include defining different upgrade rulesets for different upgrade scenarios; and in response to determining that the upgrade process is to be implemented for a site corresponding to an upgrade scenario, selecting the upgrade ruleset corresponding the upgrade scenario for performing the upgrade process for the site.

According to some embodiments, the operations include in response to identifying an issue during upgrade of a site, pausing the upgrade of the site; implementing a remediation action for the site; and in response to the remediation action completing, resuming the upgrade of the site.

According to some embodiments, the operations include receiving an instruction to assign a weight to an operational information indicator; in response to receiving a value for the operational information indicator to populate within the data repository, applying the weight to the value to create a weighted value stored within the data repository; and processing, by the model, the weighted value to create the model rules.

According to some embodiments, the operations include defining a rule that the upgrade process is to upgrade sites that are geographically proximate one another; and utilizing the rule to generate the positive list of sites to upgrade and the negative list of sites to not upgrade.

According to some embodiments, the operations include defining a rule that the upgrade process is to upgrade sites that are geographically dispersed with respect to one another; and utilizing the rule to generate the positive list of sites to upgrade and the negative list of sites to not upgrade.

According to some embodiments, a non-transitory computer-readable medium storing instructions that when executed facilitate performance of operations, is provided. The operations include tracking, within a data repository, operational information of network functions within a communication network; defining an upgrade ruleset to utilize for identifying sites within the communication network to upgrade; processing the operational information from the data repository, the upgrade ruleset, and model rules generated by a model for a set of candidate sites to generate a positive list of sites to upgrade and a negative list of sites to not upgrade; providing the negative list of sites and criteria used to determine that the negative list of sites are not being upgraded; and performing an upgrade process to upgrade the sites within the positive list of sites.

According to some embodiments, the operations include defining a rule for selecting sites to upgrade based upon a customer service disruption criterion; and utilizing the rule to generate the positive list of sites to upgrade and the negative list of sites to not upgrade.

According to some embodiments, the upgrade ruleset specifies at least one of a firmware version, an application version, or a network setting that is to be enabled for successful upgrade.

According to some embodiments, the upgrade ruleset specifies a rule that includes at least one of a value, a binary value, a range of values, an upper threshold, a lower threshold, or a set of values.

According to some embodiments, the operations include obtaining the operational information from at least one of site information, transport inventory and state data, hardware inventory and state data, cloud inventory and state data, application inventory and state data, or an element management system.

Figure 6:
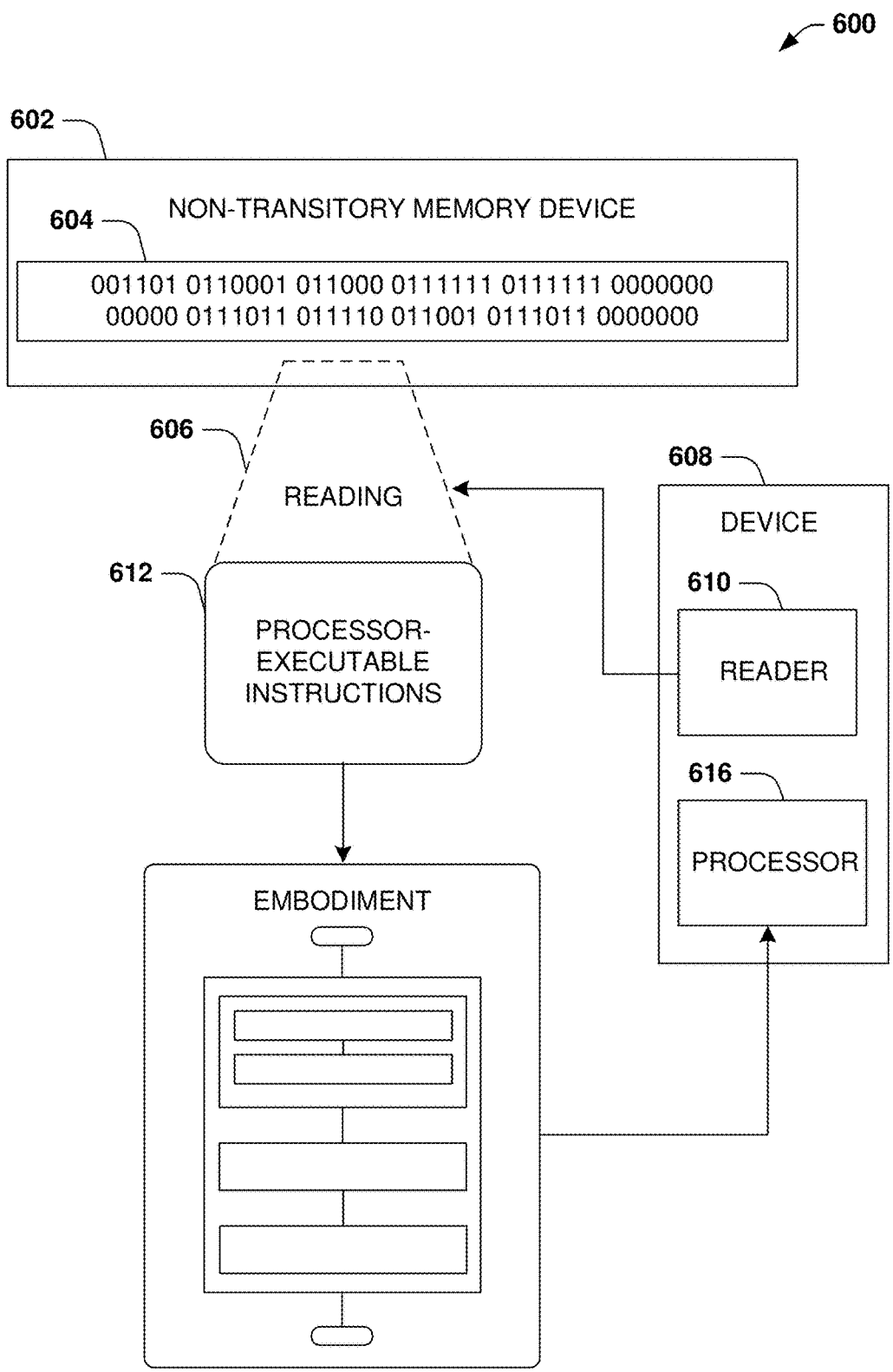
FIG. 6 is an illustration of example networks that may utilize and/or implement at least a portion of the techniques presented herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of the example system 400 of FIG. 4, and/or at least some of the example system 500 of FIGS. 5A-5C.

Figure 7:
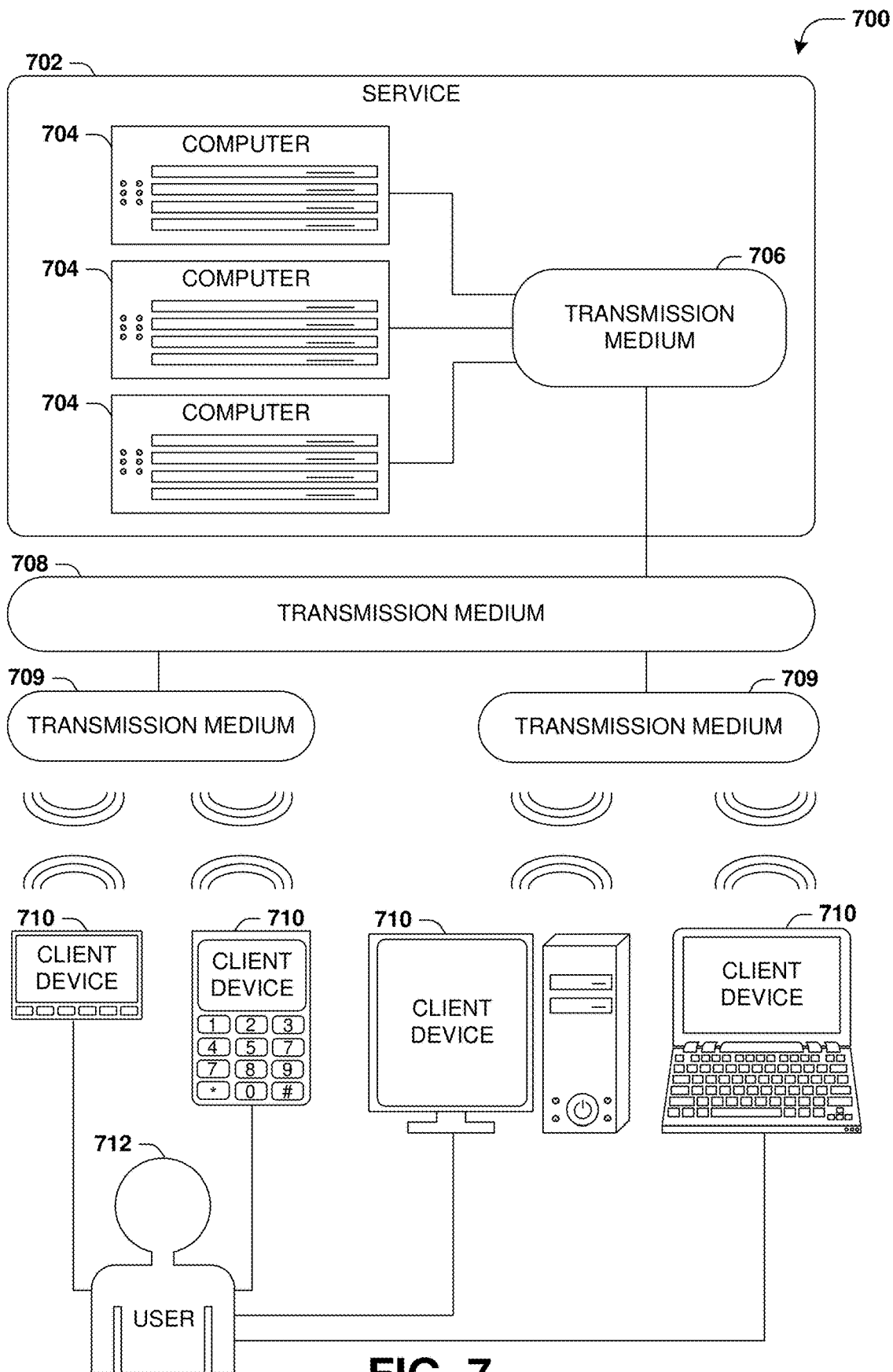
FIG. 7 is an illustration of a scenario involving an example configuration of a computer that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

In some embodiments, the computers 704 may be host devices and/or the client device 710 may be devices attempting to communicate with the computer 704 over buses for which device authentication for bus communication is implemented.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 709 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 902.11) network or a Bluetooth (IEEE Standard 902.15.1) personal area network). In this manner, the computers 704 and the client devices 710 may communicate over various types of transmission mediums.

Figure 8:
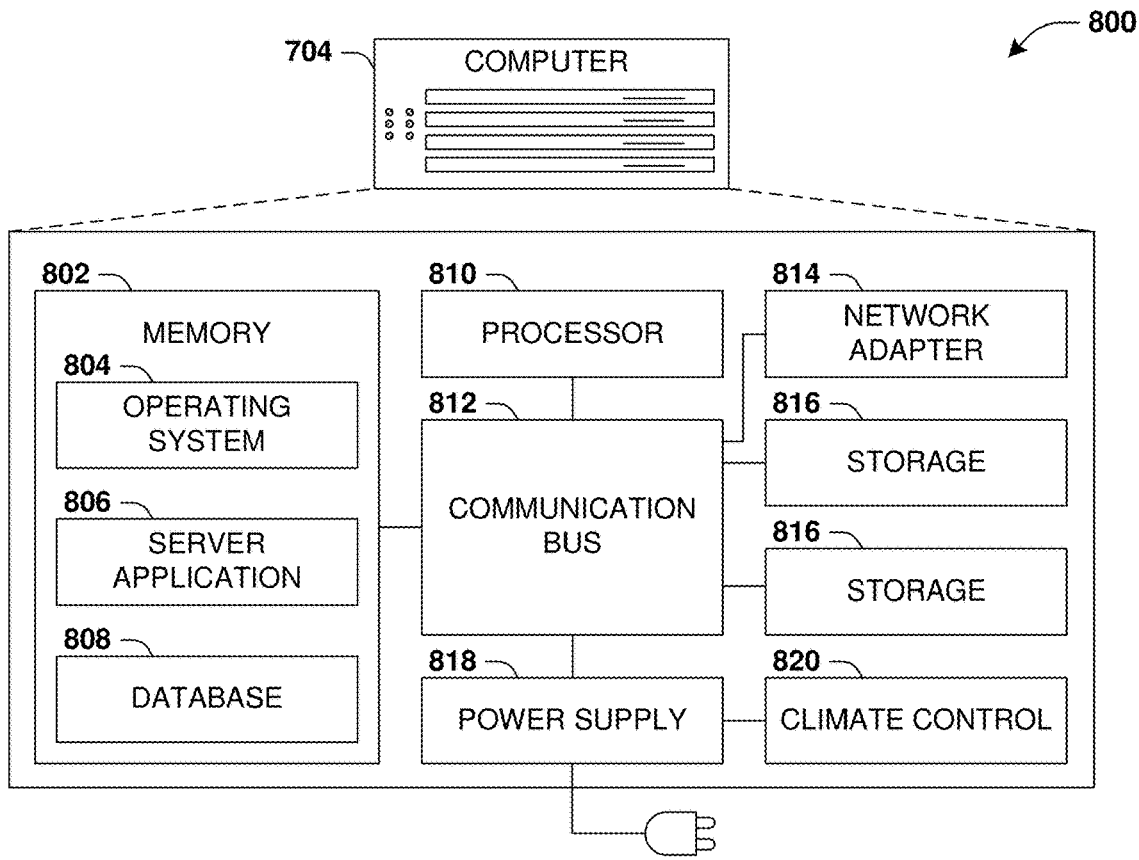
FIG. 8 is an illustration of a scenario involving an example configuration of a client that may utilize and/or implement at least a portion of the techniques presented herein.

FIG. 8 presents a schematic architecture diagram 800 of a computer 804 that may utilize at least a portion of the techniques provided herein. Such a computer 804 may vary widely in configuration or capabilities, alone or in conjunction with other computers, in order to provide a service.

The computer 604 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 804 may comprise memory 802 storing various forms of applications, such as an operating system 804; one or more computer applications 806; and/or various forms of data, such as a database 808 or a file system. The computer 804 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 804 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 804 with at least one other computer. Other components that may optionally be included with the computer 804 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 818 that supplies and/or regulates power for the other components. The computer 804 may provide power to and/or receive power from another computer and/or other devices. The computer 804 may comprise a shared and/or dedicated climate control unit 820 that regulates climate properties, such as temperature, humidity, and/or airflow. Many such computers 804 may be configured and/or adapted to utilize at least a portion of the techniques presented herein.

Figure 9:
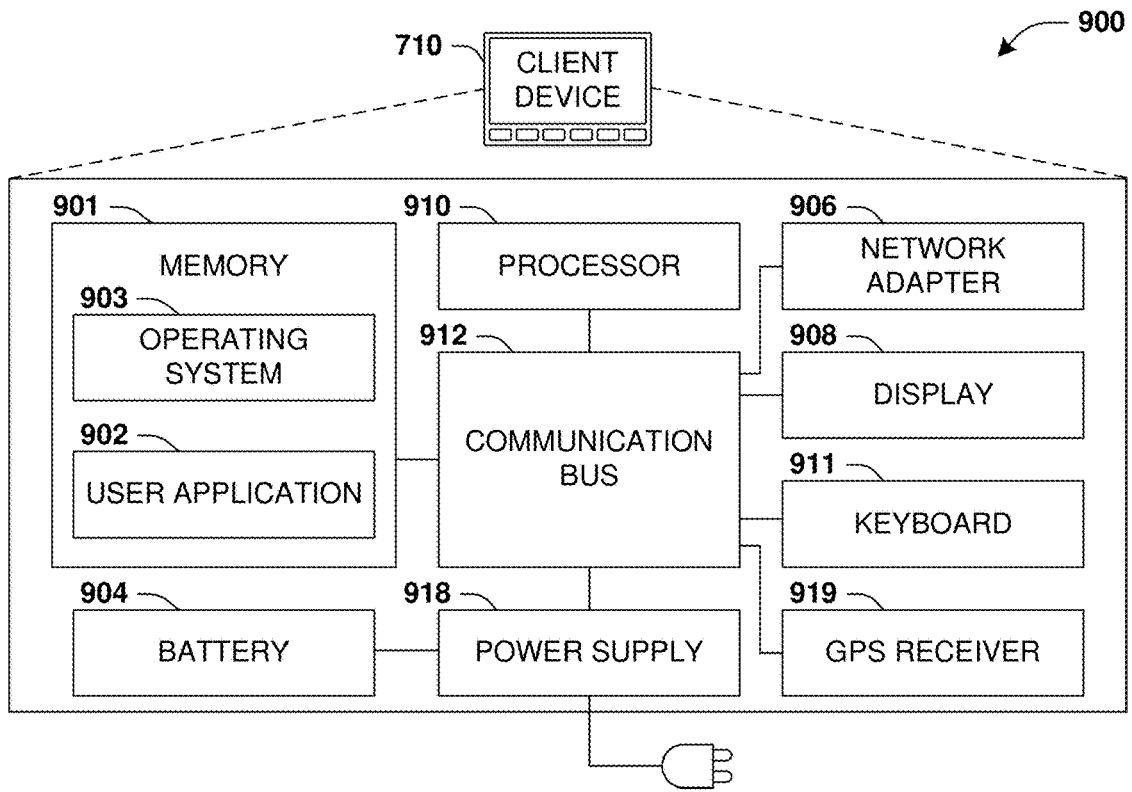
FIG. 9 is an illustration of a scenario featuring an example non-transitory machine-readable medium in accordance with one or more of the provisions set forth herein.

FIG. 9 presents a schematic architecture diagram 900 of a client device 810 whereupon at least a portion of the techniques presented herein may be implemented. Such a client device 810 may vary widely in configuration or capabilities, in order to provide a variety of functionality to a user such as the user 812. The client device 810 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 810 may serve the user in a variety of roles, such as a workstation, kiosk, media player, gaming device, and/or appliance.

The client device 810 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 810 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 810 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 810, a compass, accelerometer, and/or gyroscope that detects a physical orientation of the client device 810. Other components that may optionally be included with the client device 810 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 810 to a state of readiness; and a climate control unit that regulates climate properties, such as temperature, humidity, and airflow.

The client device 810 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 810 may comprise a dedicated and/or shared power supply 918 that supplies and/or regulates power for other components, and/or a battery 904 that stores power for use while the client device 810 is not connected to a power source via the power supply 918. The client device 810 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure.

In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:
   tracking, within a data repository, operational information of network functions within a communication network;
   defining an upgrade ruleset to utilize for identifying sites within the communication network to upgrade;
   processing the operational information from the data repository, the upgrade ruleset, and model rules generated by a model for a set of candidate sites to generate a positive list of sites to upgrade and a negative list of sites to not upgrade;
   providing the negative list of sites and criteria used to determine that the negative list of sites are not being upgraded; and
   performing an upgrade process to upgrade the sites within the positive list of sites.

2. The method of claim 1, comprising:
   monitoring the upgrade process to determine a failure rate of upgrading the sites within the positive list of sites; and
   in response to the failure rate exceeding a rate control limit, reducing a rate of upgrading the sites or pausing the upgrade process.

3. The method of claim 2, comprising:
   training the model utilizing information regarding sites that the upgrade process failed to upgrade; and
   in response to the model being trained, increasing the rate of upgrading the sites or resuming the upgrade process.

4. The method of claim 1, comprising:
   monitoring the upgrade process to determine a success rate of upgrading the sites within the positive list of sites; and
   in response to the success rate exceeding a rate control limit, increasing a rate of upgrading the sites.

5. The method of claim 1, comprising:
   scheduling the upgrade process for a timeframe that does not conflict with at least one of a planned network outage, a local network freeze, a global network freeze, or an event.

6. The method of claim 1, comprising:
collecting feedback from the upgrade process, wherein the feedback relates to collected operational information related to sites that were successfully upgraded and sites that were not successfully upgraded;
updating the data repository based upon the feedback; and
training the model utilizing the feedback, wherein the model is trained to filter out one or more sites similar to the sites that were not successfully upgraded.

7. The method of claim 1, comprising:
in response to detecting that an upgrade will utilize a new operational information indicator, modifying a structure of the data repository for tracking the new operational information indicator; and
populating the data repository with values for the new operational information indicator.

8. The method of claim 1, comprising:
identifying dependencies amongst the network functions; and
controlling the upgrade process to upgrade the sites within the positive list of sites according to an upgrade order that preserves the dependencies.

9. A computing device comprising memory storing instructions and comprising a processor that executes the instructions to perform operations comprising:
tracking, within a data repository, operational information of network functions within a communication network;
defining an upgrade ruleset to utilize for identifying sites within the communication network to upgrade;
processing the operational information from the data repository, the upgrade ruleset, and model rules generated by a model for a set of candidate sites to generate a positive list of sites to upgrade and a negative list of sites to not upgrade;
providing the negative list of sites and criteria used to determine that the negative list of sites are not being upgraded; and
performing an upgrade process to upgrade the sites within the positive list of sites.

10. The computing device of claim 9, wherein the operations comprise:
defining different upgrade rulesets for different upgrade releases; and
in response to determining that an upgrade release is to be performed, selecting the upgrade ruleset corresponding the upgrade release for performing the upgrade process.

11. The computing device of claim 9, wherein the operations comprise:
defining different upgrade rulesets for different upgrade scenarios; and
in response to determining that the upgrade process is to be implemented for a site corresponding to an upgrade scenario, selecting the upgrade ruleset corresponding the upgrade scenario for performing the upgrade process for the site.

12. The computing device of claim 9, wherein the operations comprise:
in response to identifying an issue during upgrade of a site, pausing the upgrade of the site;
implementing a remediation action for the site; and
in response to the remediation action completing, resuming the upgrade of the site.

13. The computing device of claim 9, wherein the operations comprise:
receiving an instruction to assign a weight to an operational information indicator;
in response to receiving a value for the operational information indicator to populate within the data repository, applying the weight to the value to create a weighted value stored within the data repository; and
processing, by the model, the weighted value to create the model rules.

14. The computing device of claim 9, wherein the operations comprise:
defining a rule that the upgrade process is to upgrade sites that are geographically proximate one another; and
utilizing the rule to generate the positive list of sites to upgrade and the negative list of sites to not upgrade.

15. The computing device of claim 9, wherein the operations comprise:
defining a rule that the upgrade process is to upgrade sites that are geographically dispersed with respect to one another; and
utilizing the rule to generate the positive list of sites to upgrade and the negative list of sites to not upgrade.

16. A non-transitory computer-readable medium storing instructions that when executed facilitate performance of operations comprising:
tracking, within a data repository, operational information of network functions within a communication network;
defining an upgrade ruleset to utilize for identifying sites within the communication network to upgrade;
processing the operational information from the data repository, the upgrade ruleset, and model rules generated by a model for a set of candidate sites to generate a positive list of sites to upgrade and a negative list of sites to not upgrade;
providing the negative list of sites and criteria used to determine that the negative list of sites are not being upgraded; and
performing an upgrade process to upgrade the sites within the positive list of sites.

17. The non-transitory computer-readable medium of claim 16, wherein the operations comprise:
defining a rule for selecting sites to upgrade based upon a customer service disruption criterion; and
utilizing the rule to generate the positive list of sites to upgrade and the negative list of sites to not upgrade.

18. The non-transitory computer-readable medium of claim 16, wherein the upgrade ruleset specifies at least one of a firmware version, an application version, or a network setting that is to be enabled for successful upgrade.

19. The non-transitory computer-readable medium of claim 16, wherein the upgrade ruleset specifies a rule that includes at least one of a value, a binary value, a range of values, an upper threshold, a lower threshold, or a set of values.

20. The non-transitory computer-readable medium of claim 16, wherein the operations comprise:
obtaining the operational information from at least one of site information, transport inventory and state data, hardware inventory and state data, cloud inventory and state data, application inventory and state data, or an element management system.

* * * * *